US012390907B2

United States Patent

(12) United States Patent
Hegarty et al.

(10) Patent No.: US 12,390,907 B2
(45) Date of Patent: Aug. 19, 2025

(54) RATCHETING TOOL WITH CLUTCH

(71) Applicant: STANLEY BLACK & DECKER INC., New Britain, CT (US)

(72) Inventors: Daniel Hegarty, Baltimore, MD (US); Michael Justis, Towson, MD (US); Andy Birkel, Baltimore, MD (US); Gabrielle Benson, Sparrows Point, MD (US)

(73) Assignee: STANLEY BLACK & DECKER INC., New Britain, CT (US)

( * ) Notice: Subject to any disclaimer, the term of this patent is extended or adjusted under 35 U.S.C. 154(b) by 894 days.

(21) Appl. No.: 17/260,187

(22) PCT Filed: Jul. 13, 2018

(86) PCT No.: PCT/US2018/042117

§ 371 (c)(1),
(2) Date: Jan. 13, 2021

(87) PCT Pub. No.: WO2020/013864

PCT Pub. Date: Jan. 16, 2020

(65) Prior Publication Data

US 2021/0268630 A1 Sep. 2, 2021

(51) Int. Cl.

*B25B 21/00* (2006.01)
*B25B 23/14* (2006.01)
*B25F 5/00* (2006.01)

(52) U.S. Cl.

CPC .......... *B25B 21/004* (2013.01); *B25B 23/141* (2013.01); *B25F 5/001* (2013.01)

(58) Field of Classification Search

CPC ...... B25B 21/004; B25B 23/141; B25F 5/001
See application file for complete search history.

(56) References Cited

U.S. PATENT DOCUMENTS

| | | | | | |
|---|---|---|---|---|---|
| 4,974,475 | A * | 12/1990 | Lord | B25B 21/004 | 81/57.13 |
| 6,039,126 | A * | 3/2000 | Hsieh | B66F 3/12 | 173/217 |
| 6,915,721 | B2 * | 7/2005 | Hsu | B25B 21/004 | 81/57.13 |
| 7,273,159 | B2 * | 9/2007 | Brotto | B25F 5/00 | 173/171 |
| 7,410,007 | B2 * | 8/2008 | Chung | B25B 21/00 | 173/176 |
| 7,644,783 | B2 * | 1/2010 | Roberts | B25F 5/001 | 173/217 |
| 8,695,725 | B2 * | 4/2014 | Lau | B25F 5/02 | 173/171 |
| 2003/0047890 | A1 * | 3/2003 | Iwinski | B25B 23/0021 | 173/132 |

(Continued)

*Primary Examiner* — Michelle Lopez
(74) *Attorney, Agent, or Firm* — Jordan IP Law, LLC; Todd A. Vaughn

(57) ABSTRACT

A ratcheting tool may include a motor coupled to an output drive mechanism by a clutch assembly. A torque selector may be rotatably coupled to a housing of the tool, to provide for selection of a maximum output torque. The clutch assembly may selectively disengage the motor and the output drive mechanism, or slip, in response to detection of an output torque level, or resistance torque, that is greater than or equal to the selected maximum output torque level.

34 Claims, 16 Drawing Sheets

(56) References Cited

U.S. PATENT DOCUMENTS

| | | | | |
|---|---|---|---|---|
| 2009/0126956 A1* | 5/2009 | Trautner | B25D 11/106 | 173/104 |
| 2011/0067534 A1* | 3/2011 | Cheng | B25B 23/141 | 173/176 |
| 2013/0053208 A1* | 2/2013 | Chen | B25F 5/001 | 475/302 |
| 2014/0110140 A1* | 4/2014 | Elger | B25D 11/106 | 173/48 |
| 2014/0157961 A1* | 6/2014 | Chen | B25B 21/02 | 81/464 |
| 2015/0059531 A1* | 3/2015 | Ely | B25B 21/004 | 81/57.39 |
| 2018/0272512 A1* | 9/2018 | Barzelay | B25B 21/02 | |
| 2023/0286119 A1* | 9/2023 | Banholzer | B25B 13/465 | |

* cited by examiner

RATCHETING TOOL WITH CLUTCH

FIELD

This document relates, generally, to a ratcheting tool, and in particular, to a ratcheting tool having a torque limiting clutch.

BACKGROUND

A ratcheting tool, or ratchet, may include a head portion that can engage a work piece (for example, a fastener), and a handle portion extending from the head portion for manipulation by a user. Rotation of the ratcheting tool in a first direction (i.e., rotation of the handle portion about the head portion), may cause a corresponding rotation of the work piece engaged with the head portion (for example, a tightening or a loosening of a fastener). Rotation of the ratcheting tool in a second direction (opposite the first direction) may allow the handle portion of the ratcheting tool to be repositioned, while the head portion remains stationary, to provide for additional rotation in the first direction (and corresponding additional tightening or loosening of the fastener). This ratcheting action may provide for relatively rapid tightening or loosening of a fastener while the tool remains engaged with the fastener. Some ratcheting tools may be relatively simple hand tools, while some ratcheting tools may be operated in both a power driven mode and a manual mode. Effective control of a maximum amount of torque output by the ratcheting tool and/or applied to the work piece/fastener may simplify use of the tool, may protect the work piece/fastener from damage, and may enhance the utility of the tool.

Users face many problems or hinderances in the use of common powered ratchets. One problem is that a user may receive a reactionary force or kickback from the tool that can cause harm to the user. Another issue that users face in using powered ratchets is the necessity to use and/or purchase different tools or different ratchets to perform a job. Another problem users face is the necessity to purchase an entirely new ratchet or service the existing ratchet when a drive head is damaged. Therefore, a need exists for a ratchet tool with a torque limiting clutch.

SUMMARY

In one aspect, A ratchet may include a housing, a motor in the housing, an output drive mechanism coupled to the housing, a torque selector coupled to the housing, the torque selector including a collar rotatably coupled to the housing, wherein the collar is rotatable to a plurality of positions corresponding to a plurality of torque settings, so as to provide for selection of a maximum output torque of the ratchet, and a clutch assembly selectively coupling the motor and the output drive mechanism In another aspect, a ratchet tool may include a housing, a motor in the housing, an output drive mechanism coupled to the housing, and a clutch assembly selectively coupling the motor and the output drive mechanism. The clutch assembly may include a planetary gear set coupled to an output shaft of the motor, a ring gear having an inner circumferential surface configured to selectively engage the planetary gear set, a pin cage having a plurality of openings formed therein, a clutch washer, a plurality of clutch pins respectively received in the plurality of openings in the pin cage, each of the plurality of clutch pins having a first end thereof in contact with a first side of the clutch washer, and a second end thereof in contact with an axial end portion of the ring gear, a spring cage having a plurality of recesses formed in a first side thereof, a plurality of springs each having a first end thereof received in a respective recess of the plurality of recesses in the spring cage, and a second end thereof in contact with a second side of the clutch washer, and a pressing plate positioned proximate a second side of the spring cage.

In another aspect, a ratchet tool with clutch may include a housing, a motor in the housing, n output drive mechanism coupled to the housing, a torque selector coupled to the housing, the torque selector including a collar rotatably coupled to the housing, wherein the collar is rotatable to a plurality of positions corresponding to a plurality of torque settings, so as to provide for selection of a maximum output torque of the ratchet tool, and a clutch assembly selectively coupling the motor and the output drive mechanism. The clutch assembly may include a planetary gear set coupled to an output shaft of the motor, a ring gear having an inner circumferential surface configured to selectively engage the planetary gear set, a pin cage having a plurality of openings formed therein, a clutch washer, a plurality of clutch pins respectively received in the plurality of openings in the pin cage, each of the plurality of clutch pins having a first end thereof in contact with a first side of the clutch washer, and a second end thereof in contact with an axial end portion of the ring gear, a spring cage having a plurality of recesses formed in a first side thereof, a plurality of springs each having a first end thereof received in a respective recess of the plurality of recesses in the spring cage, and a second end thereof in contact with a second side of the clutch washer, and a pressing plate positioned proximate a second side of the spring cage.

In another aspect, a ratchet tool with limiting clutch may include a housing, a motor in the housing, an output drive mechanism coupled to the housing, and a clutch assembly selectively coupling the motor and the output drive mechanism. The clutch assembly may include a planetary gear set coupled to an output shaft of the motor, a ring gear having an inner circumferential surface configured to selectively engage the planetary gear set, a pin cage, a clutch washer, a clutch interface coupled to the pin cage, wherein the pin cage having a end thereof in contact with a first side of the clutch washer, and the clutch interface having an end in contact with an axial end portion of the ring gear, a spring cage having a plurality of recesses formed in a first side thereof, a plurality of springs each having a first end thereof received in a respective recess of the plurality of recesses in the spring cage, and a second end thereof in contact with a second side of the clutch washer, and a pressing plate positioned proximate a second side of the spring cage.

This implementation of the invention, in particular, may be desired because it reduces the amount of reactionary force to a user and thus reduces the risk of harm to a user because the detection of maximum force can release the engagement of the motor and the output mechanism. This implementation of the invention may also be desired, in particular, because the coupling portion as configured to be removably coupled provides the user the ability to switch out one tool interface for another tool interface, thereby providing a user with options for different head assemblies and creating a plurality of different tools for many different jobs. Thus, to a relatively large extent, the interchangeable functionality of the drive assembly permits a user to forgo hauling multiple heavy tools and instead grants a user the ability to carry smaller tool heads for use with one main tool to perform different jobs.

The terminology used herein is for the purpose of describing implementations or embodiments only and is not intended to be limiting of the invention. As used herein, the singular forms, "a", "an" and "the" are intended to include the plural forms as well, unless the context clearly indicates otherwise. It will be further understood that the root terms "can", "include", "can include", "may", and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein "connected" or "attached" includes operation or physical, whether direct or indirect, affixed or coupled, as for example, a connection of the clutch assembly 220 to an input shaft 260, or crank shaft 260. Thus, unless specified, "connected" or "attached" is intended to embrace any operationally functional connection.

As used herein "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The details of one or more implementations are set forth in the accompanying drawings and the description below. Other features will be apparent from the description and drawings, and from the claims.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION

Figure 1:
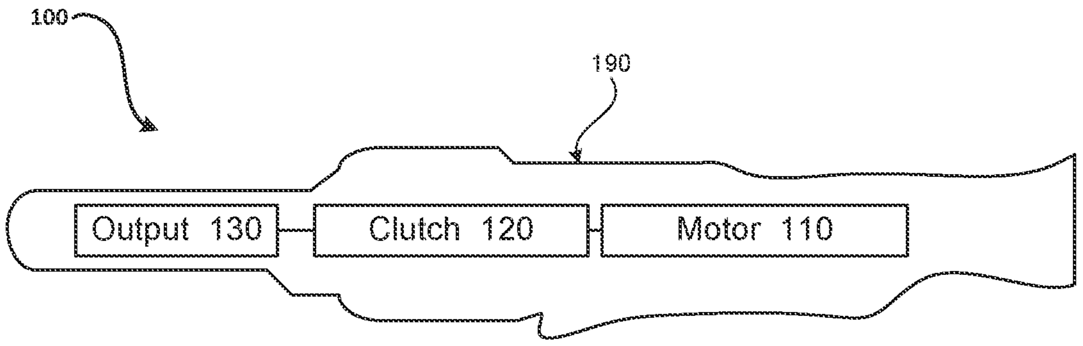
FIG. 1 is a schematic view of an exemplary tool, in accordance with implementations described herein.

A schematic view of an exemplary power driven tool 100, such as, for example, a power driven ratcheting tool 100, is shown in FIG. 1. The exemplary ratcheting tool 100 illustrated in FIG. 1 is a powered ratcheting tool 100 which may be operated in a power driven mode, and in a manual mode. The exemplary tool 100 includes a motor 110 selectively engaged with an output mechanism 130 by a clutching mechanism 120. The motor 110, the clutching mechanism 120 and a portion of the output mechanism 130 may be received in and/or coupled to a housing 190. In some implementations, the motor 110 may be an electric motor that receives power from, for example, a power storage device (such as, for example, a battery), an external electrical power source, and the like. In some implementations, the motor 110 may be an air driven, or pneumatic motor, that is powered by compressed air introduced into the housing 190 from an external compressed air source. Other types of motors, and other sources of power, may provide for power driven operation of the tool 100. The clutching mechanism 120 may include, for example, a slip clutch, that can selectively engage and disengage the motor 110 and the output mechanism 130, based on, for example, a selected, or set, maximum output torque level for the output mechanism 130 for a particular application.

Figure 2:
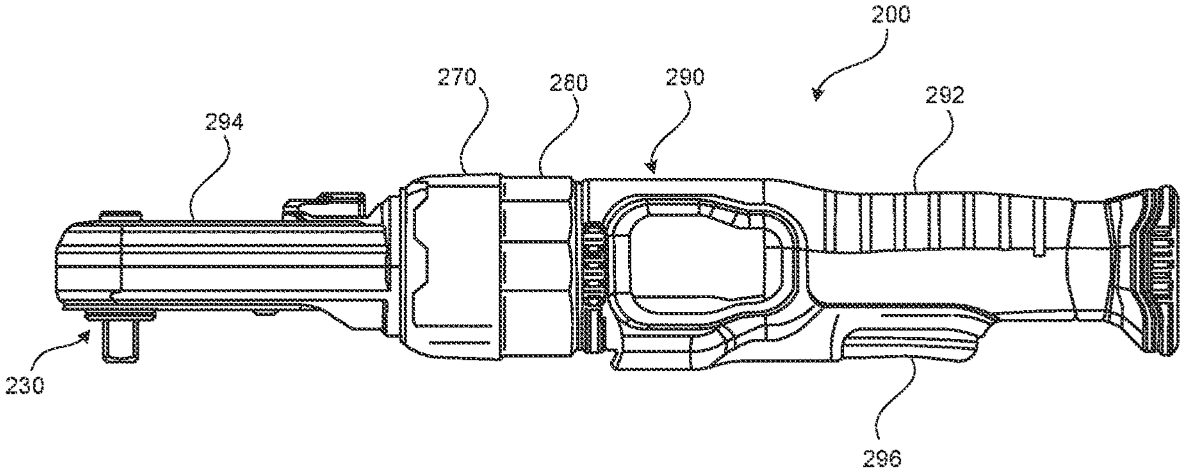
FIG. 2 is a side view of an exemplary ratcheting tool, in accordance with implementations described herein.

FIG. 2 illustrates an exemplary ratcheting tool 200, in accordance with implementations described herein. Components of the tool 200 may be received in a housing 290 including a handle housing 292, which may be grasped by a user, and a ratchet head housing 294, in which components of an output mechanism 230 may be received in and/or coupled to the ratchet head housing 294. The handle housing 292, or motor housing 292, and the ratchet head housing 294 may be coupled, for example threadably coupled, by a coupler 280. A trigger 296 may be selectively actuated by the user, to selectively apply power to a motor 210 (see FIG. 5) received in the housing 290. A torque selector 270, or collar 270 may be movably coupled on the housing 290. Manipulation of the torque selector 270, or collar 270 may allow a user to select a maximum output torque level to be transmitted to/by the output mechanism 230. For example, in some implementations, a clutching mechanism (not shown in FIG. 2) received in the housing 290 may disengage a motor (not shown in FIG. 2) from driving components of the output mechanism 230, so that the torque level output at the output mechanism 230 does not exceed the maximum output torque level selected by the user through manipulation of the torque selector 270, or collar 270. In alternate implementations, the torque selector can be embodied as releasable or push buttons, catches, and switch mechanisms.

Figure 3A:
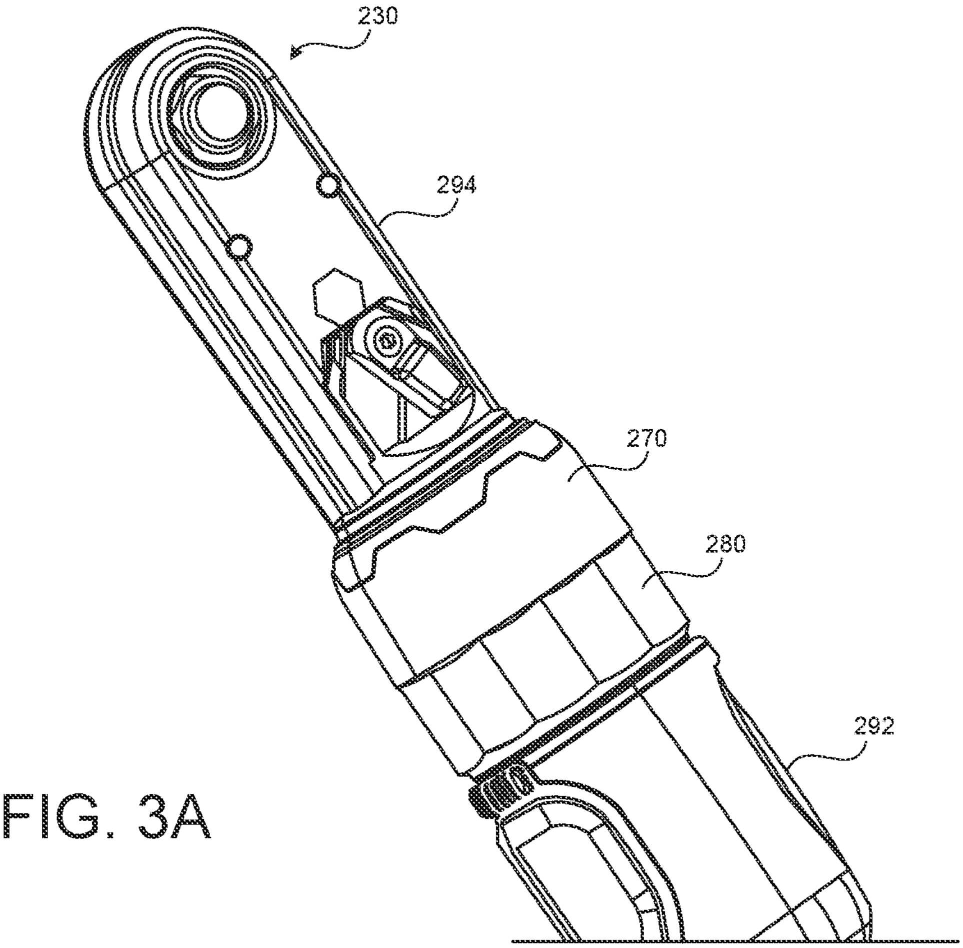
FIG. 3A is a perspective view of a ratchet head portion of the exemplary ratcheting tool shown in FIG. 2.
Figure 3B:
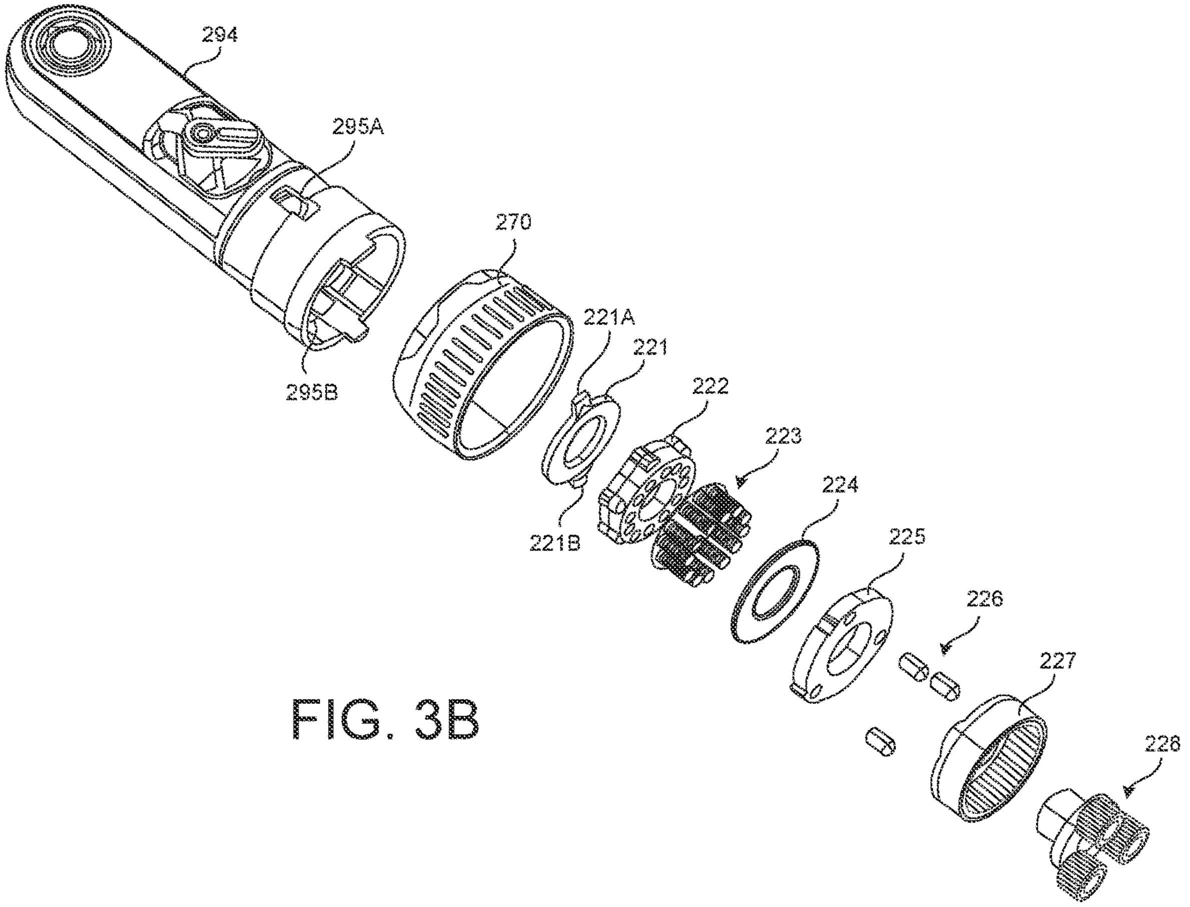
FIG. 3B is an exploded perspective view of the ratchet head portion of the exemplary ratcheting tool shown in FIG. 3A, in accordance with implementations described herein.
Figure 4A:
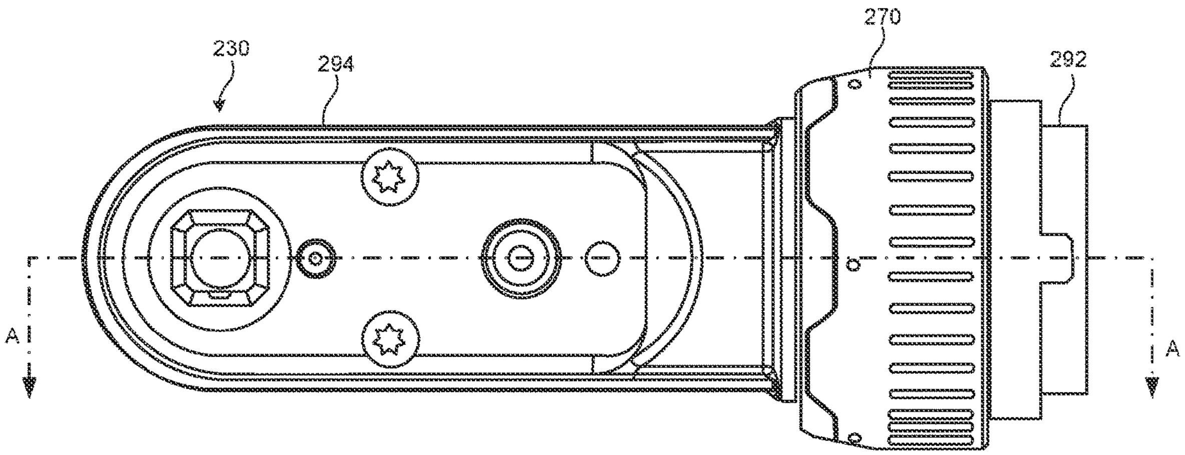
FIG. 4A is a top view of the ratchet head portion of the exemplary ratcheting tool shown in FIG. 2.

FIG. 3A is a perspective view of a ratchet head portion of the ratcheting tool 200 shown in FIG. 2, and FIG. 3B is an exploded perspective view of the ratchet head portion of the ratcheting tool 200 shown in FIG. 3A, including an exploded perspective view of an exemplary clutch assembly 220 received in the ratchet head housing 294, in accordance with implementations described herein. The exemplary clutch assembly 220 provides one example of a clutch assembly, and in particular, a slip clutch assembly, which may be incorporated into the exemplary ratcheting tool 200 to provide for output torque control of the tool 200. Other arrangements and/or combinations of components of this type of slip clutch assembly may also be considered or adapted for operation of the ratcheting tool 200. FIG. 4A is a top view of the ratchet head portion of the ratcheting tool 200, and FIG. 4B is a cross-sectional view of the ratchet head portion of the ratcheting tool 200 taken along line A-A of FIG. 4A, in accordance with implementations described herein.?

Figure 4B:
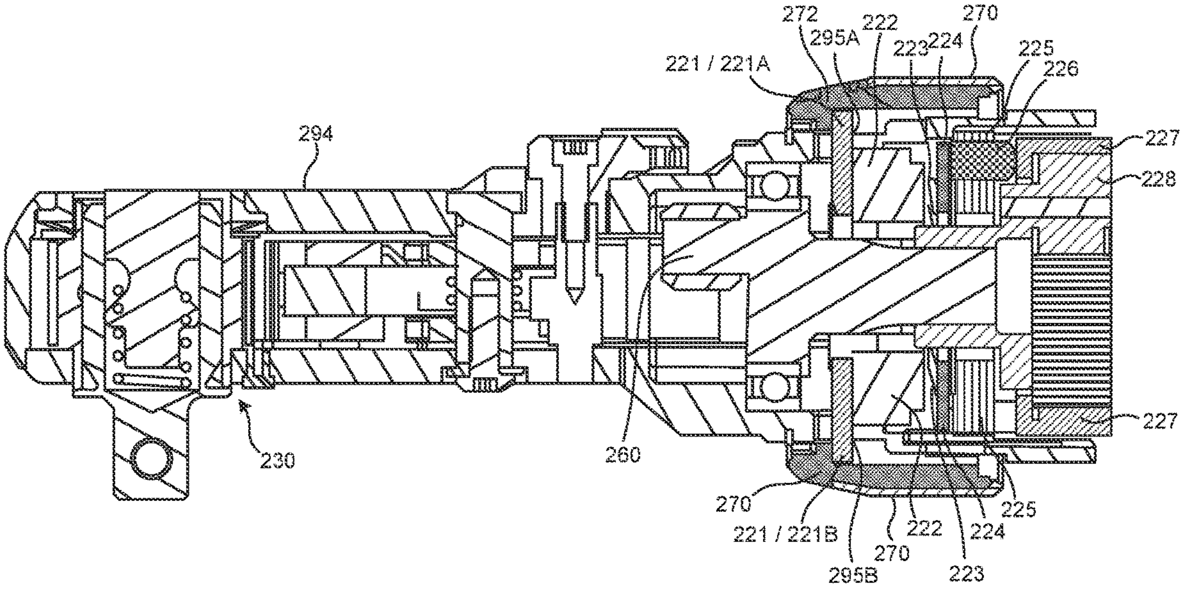
FIG. 4B is a cross-sectional view of the ratchet head portion of the exemplary ratcheting tool, taken along line A-A of FIG. 4A, in accordance with implementations described herein.

As shown in FIGS. 3B and 4B, the exemplary clutch assembly 220 may include a pressing plate 221. A first arm 221A and a second arm 221B of pressing plate 221 may each extend radially outward from respective outer circumferential portion of the pressing plate 221. The first arm 221A and the second arm 221B may be positioned substantially diametrically opposite each other with respect to the pressing plate 221. When installed in the housing 290, the first arm 221A may extend through a first slot 295A formed in the ratchet head housing 294, and the second arm 221B may extend through a second slot 295B formed in the ratchet head housing 294. A plurality of clutch springs 223 may each have a first end thereof retained in a corresponding recess defined in a spring cage 222, and a second end thereof positioned adjacent to, or against, or in contact with, a first side of a clutch washer 224. The plurality of clutch springs 223 may be compressed in the axial direction, and released in the axial direction, in response to axial movement of other components of the clutch assembly 220. The plurality of clutch springs, in accordance with implementations described herein, may include one or more springs configured for compression or release in an axial compression, and in some implementations, the plurality of clutch springs may include one or more springs having a different size (for example, interface size) for use with a spring cage having corresponding recesses for use with the plurality of clutch springs.

A plurality of clutch pins 226 may be positioned between the clutch washer 224 and a corresponding axial end portion of a ring gear 227. Each of the plurality of clutch pins 226 may extend through a corresponding opening in a pin cage 225, such that the clutch pins 226 are axially movable in the openings in the pin cage 225. A first end of each of the clutch pins 226 may be positioned adjacent to, or against, or contacting, a second side of the clutch washer 224 so that the clutch washer 224 is positioned between the plurality of clutch springs 223 and the plurality of clutch pins 226. A second end of each of the clutch pins 226 may be positioned adjacent to, or against, or contacting, the corresponding axial end portion of the ring gear 227. As the plurality of clutch pins 226 are axially movable in the openings in the pin cage 225, compression and/or release of the compression of the plurality of clutch springs 223, and axial movement of the clutch washer 224 in response to the compression/release of the clutch springs 223, may cause corresponding axial movement of the clutch pins 226 positioned against the axial end portion of the ring gear 227.

A planetary gear set 228 may be selectively engaged with an inner circumferential surface of the ring gear 227. The planetary gear set 228 may be coupled to a shaft of the motor 210. The planetary gear set 228 may be driven in response to a force transmitted thereto from the motor 210 via the motor shaft, to selectively transfer power from the motor 210 to the output mechanism 230, based on an engagement state provided by the clutch assembly 220. Some embodiments of the clutch assembly 220 may include the pressing plate 221, the spring cage 222, the plurality of clutch springs 223, the clutch washer 224, the pin cage 225, the plurality of clutch pins 226 and the ring gear 227 but may include fewer or more components to provide output torque control of the tool 200. Operation of the clutch assembly 220, and corresponding engagement and/or disengagement of the motor 210 and the output mechanism 230, will be discussed in more detail below.

Figure 5:
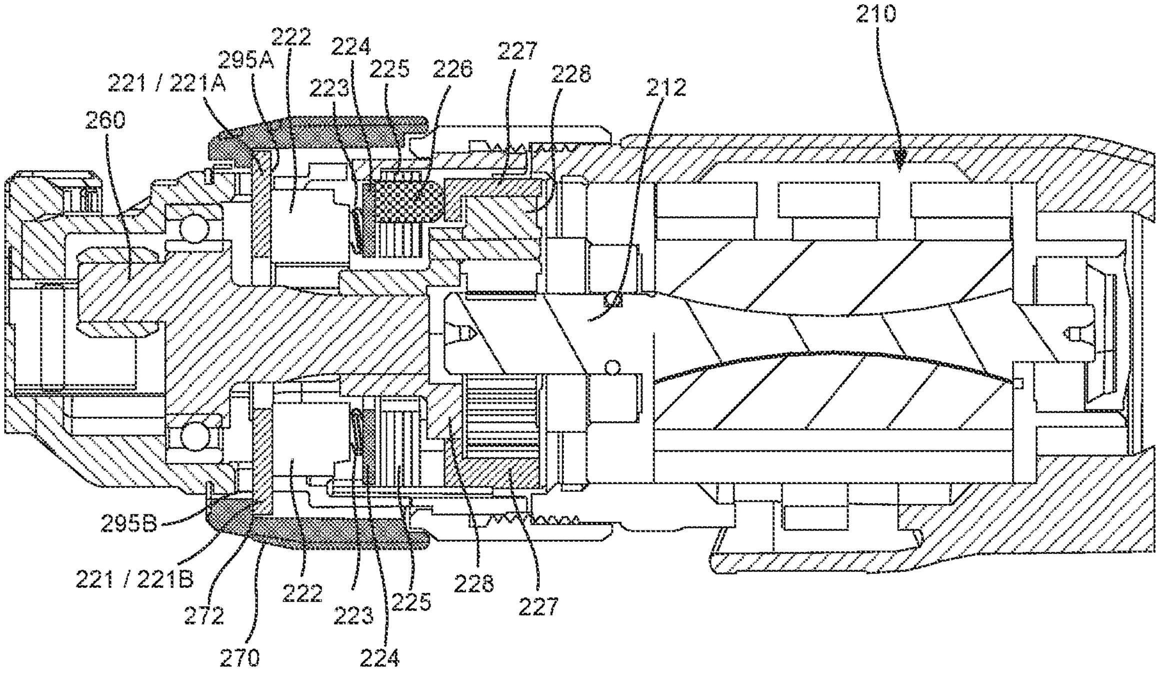
FIG. 5 is a cross sectional view of the exemplary ratcheting tool, in accordance with implementations described herein.

FIG. 5 is a partial cross-sectional view of the exemplary ratcheting tool 200, illustrating a connection of the motor 210 to the clutch assembly 220, and a connection of the clutch assembly 220 to an input shaft 260, or crank shaft 260, for driving the output mechanism 230, in accordance with implementations described herein. In the example implementation shown in FIG. 5, the motor 210 is an air driven motor, simply for purposes of discussion and illustration. The principles to be described herein may be applied in power driven ratcheting tools including other types of motors, driven by other sources/types of power, for example the ratcheting tool 200 can be a cordless power driven ratcheting tool where the motor 210 supplied power by an interchangeable battery.

In operating the exemplary power driven ratcheting tool 200 in the power driven mode, power may be transmitted from the motor 210 (via the motor shaft 212) to the planetary gear set 228, and on to the input shaft 260, or crank shaft 260. The crank shaft 260 may in turn transmit power to the output mechanism 230, for operation of ratcheting components of the output mechanism 230. In particular, in the power driven mode, power is transmitted from the motor 210 to the output mechanism 230 in this manner in a condition in which the ring gear 227 is rotationally locked, or essentially restricted from rotation. In a condition in which the ring gear 227 slips, or is allowed to rotate, power output by the motor 210 is not transmitted to the output mechanism 230. That is, in the condition in which the ring gear 227 slips, the planetary gear set 228 may continue to rotate in response to power transmitted thereto from the motor 210; however, due to the slippage, or rotation of the ring gear 227, that power will no longer be transmitted through the crank shaft 260 to the ratcheting components of the output mechanism 230. The torque level at which the ring gear 227 transitions from a fixed, or rotationally locked, or non-rotating state, to the slipped, or rotationally unlocked, or rotating state, may be controlled by the clutch assembly 220, based on the maximum output torque level set, or selected through manipulation of the collar 270.

Figure 6A:
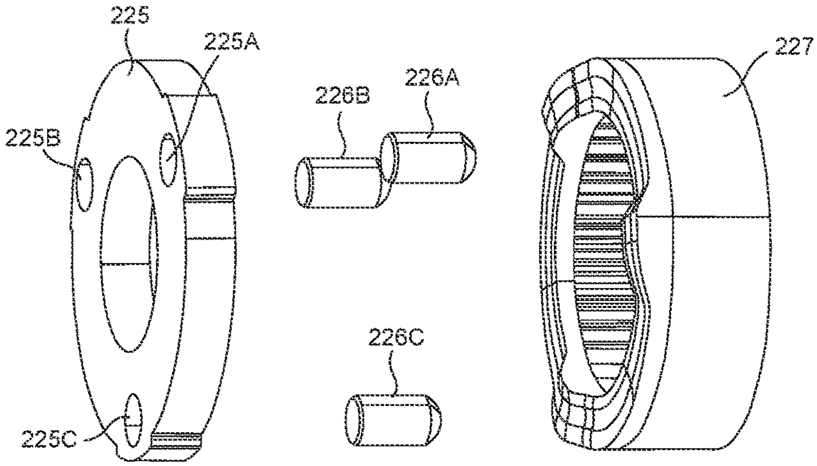
FIGS. 6A and 6B illustrate a pin cage and a ring gear of an exemplary clutch assembly of the exemplary ratcheting tool, in accordance with implementations described herein.
Figure 6B:
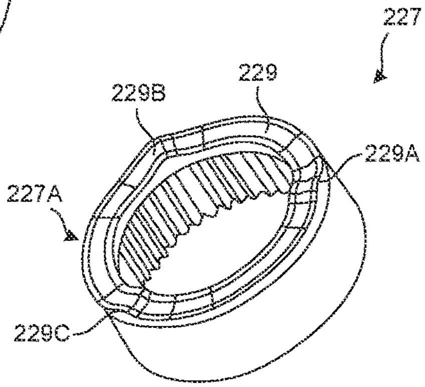

FIG. 6A is an exploded view of the pin cage 225, the plurality of clutch pins 226, and the ring gear 227, and FIG. 6B is a perspective view of the ring gear 227. The exemplary implementation illustrated in FIG. 6A includes three clutch pins 226 (226A, 226B and 226C) and three openings 225A, 225B and 225C in the pin cage 225, in which the clutch pins 226A, 226B and 226C are respectively received. A number and/or an arrangement of the clutch pins 226 and the corresponding openings in the pin cage 225 may vary based on a particular combination of components. The clutch pins 226 are illustrated in this embodiments as pins but may be any As noted above, the clutch pins 226 may be axially movable in the openings in the pin cage 225, based on a compressed/neutral state of the clutch springs 223 and a corresponding axial position of the clutch washer against the first end portion of the clutch pins 226. In this implementation, the pin cage 225 is contained within the housing and allows an outer diameter ratchet head which allows the ratcheting tool to handle a higher load or torque.

As noted above, the second end portions of the clutch pins 226 may be positioned adjacent to, or in contact with, the axial end portion 227A of the ring gear 227. The axial end portion 227A of the ring gear 227 may be contoured, defining a ramped surface 229 including one or more ramps on the axial end portion 227A of the ring gear 227. In the example implementation illustrated in FIGS. 6A and 6B, the ramped surface 229 includes ramps 229A, 229B and 229C (which may correspond, for example, to the clutch pins 226A, 226B and 226C). A number, a contour, a placement, and the like of the ramps formed on the ramped surface 229 of the ring gear 227 may vary based on a particular combination of components.

The second end portions of the clutch pins 226 may engage, or contact, the axial end portion 227A of the ring gear 227, moving, or sliding along the ramp surface 229 of the ring gear 227. The clutch pins 226 and the ramped surface 229 are pressed against each other by a force applied by the clutch springs 223. The magnitude of the force applied by the clutch springs 223, causing the clutch pins 226 to move axially, may vary based on an amount of compression of the clutch springs 223. As the output torque level increases, an output torque level greater than a set threshold (corresponding, for example, to the maximum output torque level set or selected through manipulation of the collar 270) will cause the springs to compress, and cause the clutch pins 226 riding in the ramped surface 229 to jump, or ride over, the ramps 229A, 229B, 229C, causing the ring gear 227, and the clutch assembly 220, to slip or rotate. That is, as an amount of detected amount of output torque, and in particular, detected resistance torque, increases, the clutch pins 226 move along the ramped surface 229, and up the ramps 229A, 229B, 229C. Due to the geometry of the ramps 229A, 229B, 229C, movement of the clutch pins 226 up the ramps in this manner causes the clutch pins 226 to move axially, toward the clutch washer 224, thus moving the clutch washer 224 axially and compressing the clutch springs 223. In response to detection of a torque level exceeding the maximum output torque level (set, for example through manipulation of the collar 270), the clutch pins 226 will move, or travel, or jump over the ramps, disengaging the ring gear 227 and causing the ring gear 227, and the clutch assembly 220, to slip. In this slipped condition, the ring gear 227 will continue to rotate, or slip, while the trigger 296 is depressed and the motor 210 is generating power, but torque will not be transmitted to the crank shaft 232.

One type of clutch setting can limit the torque transmitted from the motor 210 to the output mechanism 230. The amount of compression of the clutch springs 223, affecting the positioning and movement of the clutch pins 226 along the ramped surface 229, may vary based on an amount of output torque, and in particular, resistance torque, detected, affecting the axial position of the pressing plate 221. The axial position of the pressing plate 221 may vary based on contact, or interface, or engagement of the pressing plate 221, and in particular, the first and second arms 221A and 221B of the pressing plate 221, with an interior geometry of the collar 270. As the collar 270 is manipulated into a physical position corresponding to the selected maximum output torque level, this interaction, or engagement, between the pressing plate 221 (i.e. the first and second arms 221A, 221B of the pressing plate 221) and the interior geometry of the collar 270 may affect the torque level which causes the ring gear 227, and the clutch assembly 220, to slip or rotate. This interface, or interaction, will be described in more detail with respect to FIGS. 7A-7B.

A second clutch type of setting may not limit the amount of the torque transmitted from the motor 210 to the output mechanism 230. The clutch collar 270 has a setting where it positions the clamping plate 221 and spring cage 222 axially toward the clutch washer 224, pins 226, and ring gear 227, in such a way as to prevent the pins 226 from axially moving out of the way of the ring gear ramp 229B. The pins 226 are limited axially by the position of the spring cage 222, and therefore prevent the ring gear 227 from slipping or rotating even though high torsional loading may be experienced at the output of the ratchet mechanism. In this implementation, based on the clutch setting, the power from the motor is not disengaged from the output mechanism and there may be a hard stop that prevents the ring gear from every spinning. It is a mechanical locking that prevents the ring gear from ever slipping.

In some implementations, the torque level at which the ring gear 227 slips may be further affected by the coefficient of friction between the clutch pins 226 and the ramped surface 229 of the ring gear 227, the contour, or angle of the ramps formed on the ramped surface 229, the magnitude of the force applied to the clutch pins 226 by the compression of the clutch springs 223, and other such factors.

Figure 7A:
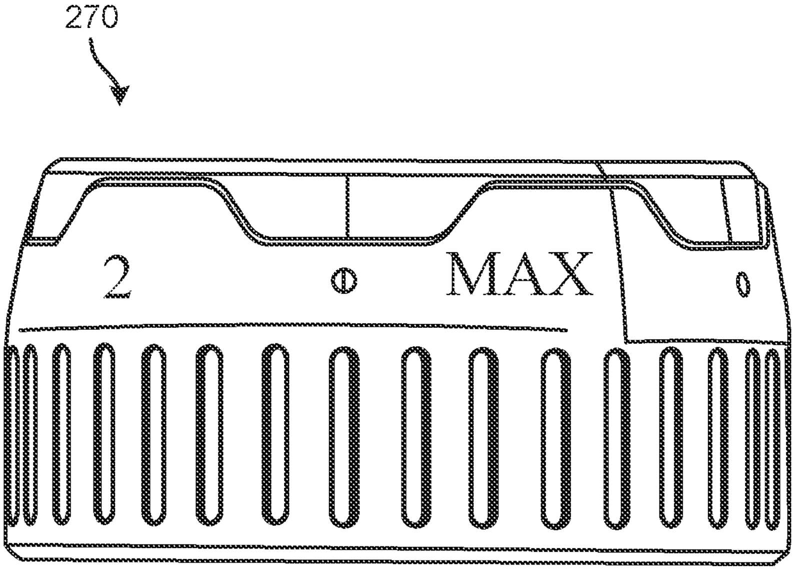
FIGS. 7A and 7B illustrate a torque selector of the exemplary ratcheting tool, in accordance with implementations described herein.
Figure 7B:
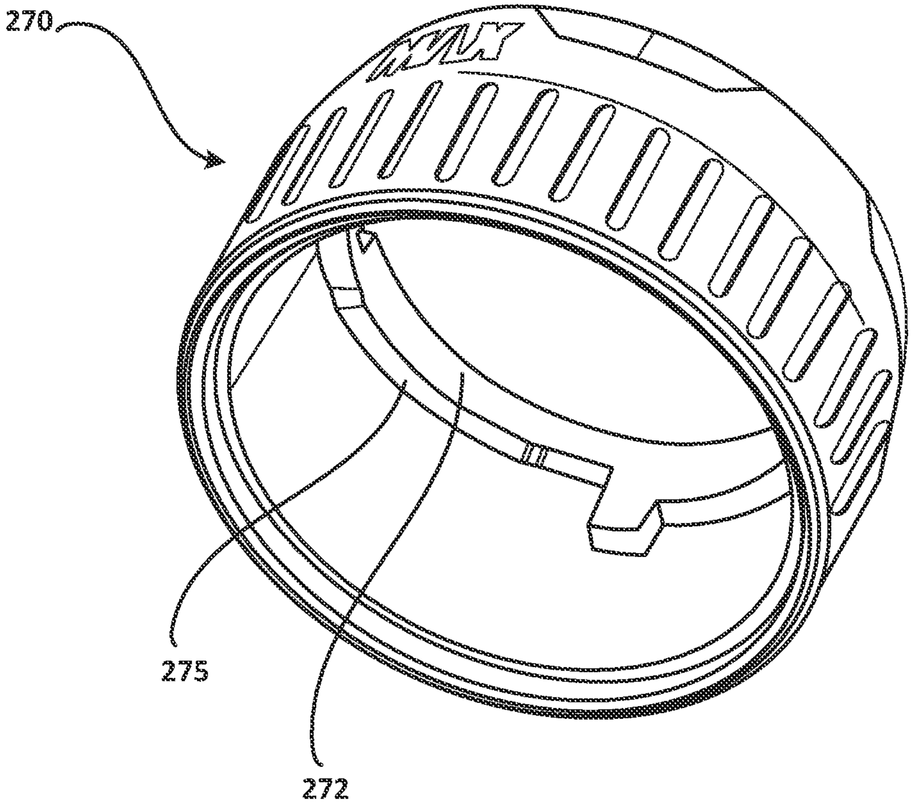

FIG. 7A is a side view of the collar 270 of the exemplary ratcheting tool 200, and FIG. 7B is a perspective view of the collar 270, illustrating some of the interior geometry of the collar 270. As described above, referring back to FIG. 4B, the first arm 221A of the pressing plate 221 extends through the first slot 295A in the ratchet head housing 294, and the second arm 221B of the pressing plate 221 extends through the second slot 295B in the ratchet head housing 294. Distal end portions of the first and second arms 221A, 221B may engage with a protruded portion 272, or step portion 272, of the interior of the collar 270. The engagement of the first and second arms 221A, 221B with the step portion 272 of the interior of the collar 270 may support an axial position of the pressing plate 221, and/or set the axial position of the pressing plate 221.

As shown in FIG. 7B, the step portion 272 of the interior of the collar 270 may include a contoured, or ramped surface 275. An arrangement of the contouring, or ramping, of the ramped surface 275 along the inner circumferential portion of the collar 270 may correspond to a plurality of different maximum output torque level settings arranged along the outer circumferential portion of the collar 270. The first and second arms 221A, 221B of the pressing plate 221 may engage the ramped surface 275 of the step portion 272 of the collar 270. In particular, the interface, or contact between, or engagement of, the first and second arms 221A, 221B with a portion of the ramped surface 275 (based on the rotational position of the collar 270 and corresponding maximum output torque setting) will affect an axial position of the pressing plate 221, based on the contouring of the ramped surface 275. In some implementations, the first and second arms 221A, 221B may be received in detents in the ramped surface 275 of the stepped portion 272 of the collar 270, to provide a measure of feedback to the user when rotating the collar 270 to select a particular maximum output torque level. The axial position of the pressing plate 221 will in turn affect the amount of compression of the clutch springs 223. The amount of compression of the clutch springs 223 will, as described above, affect the reactionary torque level causing the ring gear 227 to slips as described above.

That is, as the collar 270 is rotated, the first and second arms 221A, 221B of the pressing plate 221 move along the ramped surface 275 on the inner circumferential portion of the collar 270. The geometry, or contouring, or ramping of the ramped surface 275 causes the pressing plate 221 to move axially (for example, to the left or to the right in the example orientation shown in FIG. 4B). For example, if the contouring of the ramped surface 275 were to cause the pressing plate 221 to move in a direction to compress (or further compress, or essentially fully compress) the clutch springs 223, the additional force exerted on the clutch pins 226 may impede the movement of the clutch pins 226 up and over the ramps on the ramped surface 229 of the ring gear 227. This may reflect, for example, a maximum setting for the allowable output torque level. Similarly, if the contouring of the ramped surface 275 were to cause the pressing plate 221 to move in a direction to release compression of the clutch springs 223 (for example, to the left, in the example orientation shown in FIG. 4B), the lesser force exerted on the clutch pins 226 may impede the movement of the clutch pins 226 up and over the ramps on the ramped surface 229 of the ring gear 227 until the output torque level (detected resistance torque) reaches the maximum output torque level selected based on the rotational position of the collar 270. In this situation, at the point at which the output torque level is greater than or equal to the selected maximum output torque level, the clutch pins 226 may ride up and over the ramps of the ramped surface 229 of the ring gear 227, allowing the ring gear 227 to slip so that torque is not transmitted to the output mechanism 230.

As noted above, in some implementations, the exemplary power driven ratcheting tool 200 may be operated in a power driven mode, and in a manual mode (in which power is not transmitted from the motor 210 to the output mechanism 230 to implement a power ratcheting function). In some situations, a user may wish to operate the ratcheting tool in the manual mode, to allow for manual, or hand tightening of a work piece/fastener. This may also provide an advantage in protecting bits and fasteners from over stripping by the power driven ratcheting tool. In the exemplary power driven ratcheting tool 200, in accordance with implementations described herein, the clutch assembly 220 is substantially entirely contained within the confines of the ratchet head housing 294. The structural integrity of the ratchet head housing 294, and containment of the clutch assembly 220 within the confines of the ratchet head housing 294, may allow manual torque to be transferred, through the ratchet head housing 294, to, for example, a square drive or square drive assembly of the output mechanism 230, while still allowing the slip clutch assembly 220 to operate, and slip at a selected maximum output torque level as described above. This may allow the power driven ratcheting tool, in accordance with implementations described herein, to be effectively operated in the manual mode.

As previously noted, the exemplary implementation described above includes a pressing plate 221 having two arms 221A, 221B extending radially therefrom, at diametrically opposed positions, for ease of discussion and illustration. In some implementations, the pressing plate 221 may include more, or fewer arms extending radially outward from therefrom, and/or arranged at different positions on the pressing plate 221. Similarly, the exemplary implementation described above includes a plurality of clutch springs 223 received in the spring cage 222. In some implementations, the clutch assembly 220 may include more, or fewer, clutch springs 223 and/or a different arrangement of clutch springs 223 than illustrated. Further, the exemplary implementation described above includes three clutch pins 226A, 226B, 226C interacting with three ramps 229A, 229B, 229C on the ramped surface 229 of the ring gear 227, for ease of discussion and illustration. In some implementations, the clutch assembly 220 may include more, or fewer clutch pins 226 and/or more or fewer ramps formed on the ramped surface 229 of the ring gear 227.

The exemplary implementation described above includes the pressing plate 221 and the spring cage 222 as separate components, simply for ease of discussion and illustration. In some implementations, the pressing plate 221 and the spring cage 222 may be formed as a single unit, or integrally formed. Similarly, the exemplary implementation described above includes the clutch washer 224 and the pin cage 225 as separate components, simply for ease of discussion and illustration. In some implementations, the clutch washer 224 and the pin cage 225 may be formed as a single unit, or integrally formed.

A ratcheting tool, in accordance with implementations described herein, may include a square drive assembly that interfaces with a work piece/fastener to transmit force (for example, rotational, or ratcheting force). In some implementations, a first square drive assembly may be removed from the ratcheting tool and replaced with a second square drive assembly having a different size (for example, interface size) than the first square drive assembly. The ability to interchange square drive assemblies having different interface sizes, without the use of an adapter, may reduce overall size, and may render the ratcheting tool usable in smaller spaces, and for more applications, thus enhancing utility and functionality of the tool. In other implementations, a first square drive assembly may be removed from the ratcheting tool and replaced with a different drive assembly having a different size (for example, a drive assembly with a screwdriver head) than the first square drive assembly. The ability to interchange drive assemblies having different interfaces, without use of an adapter, may render the ratcheting tool usable in smaller spaces, and for more applications, thus enhancing utility and functionality of the tool. Utility and functionality may be further enhanced by a simplified mechanism to release a square drive assembly from the tool, and to securely couple the drive assembly to the tool.

Figure 8:
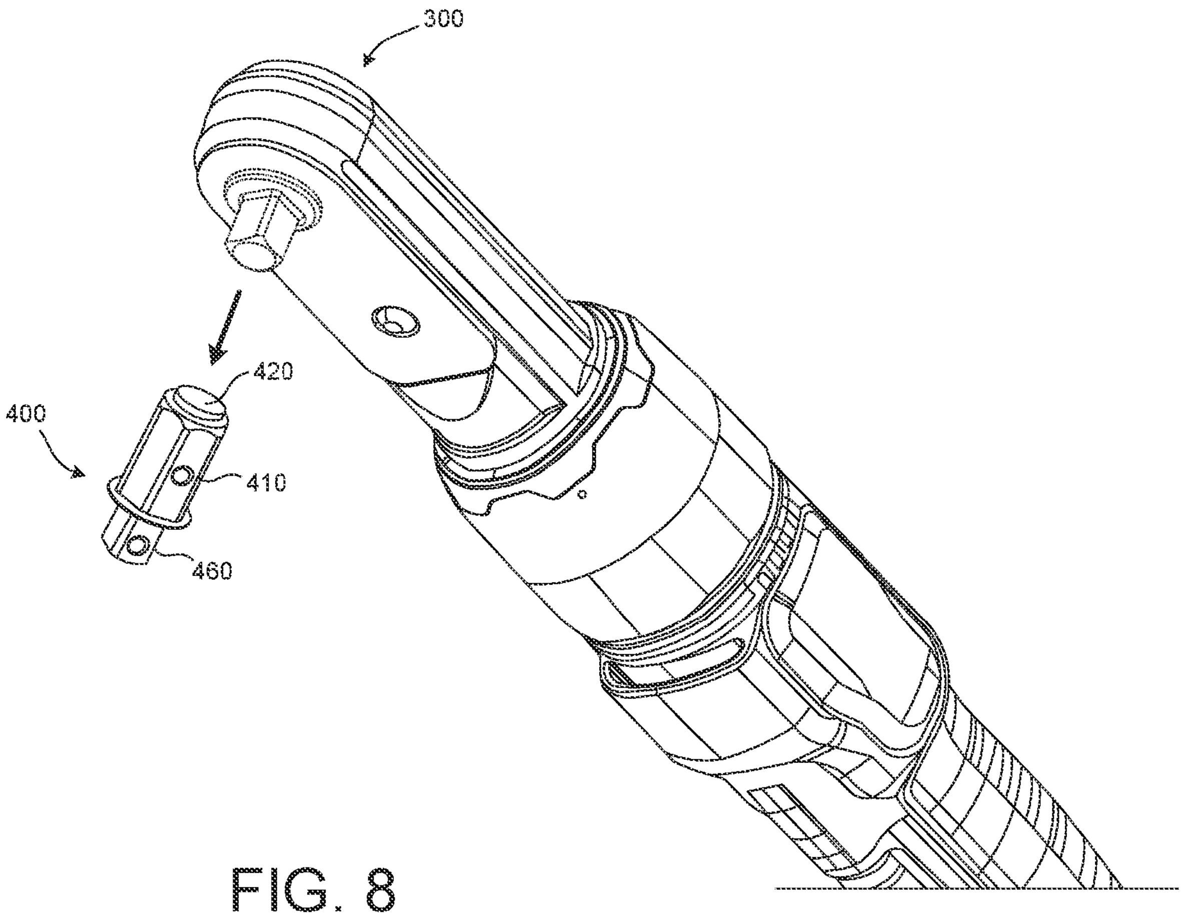
FIGS. 8, 9A and 9B illustrate an exemplary ratcheting tool including a removable square drive assembly, in accordance with implementations described herein.
Figure 9A:
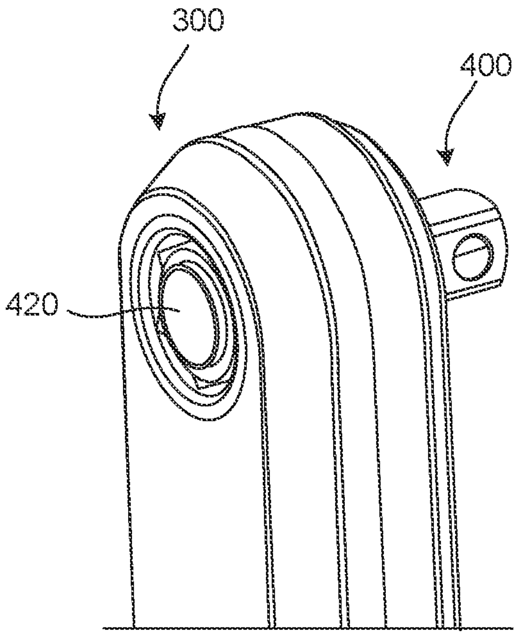
Figure 9B:
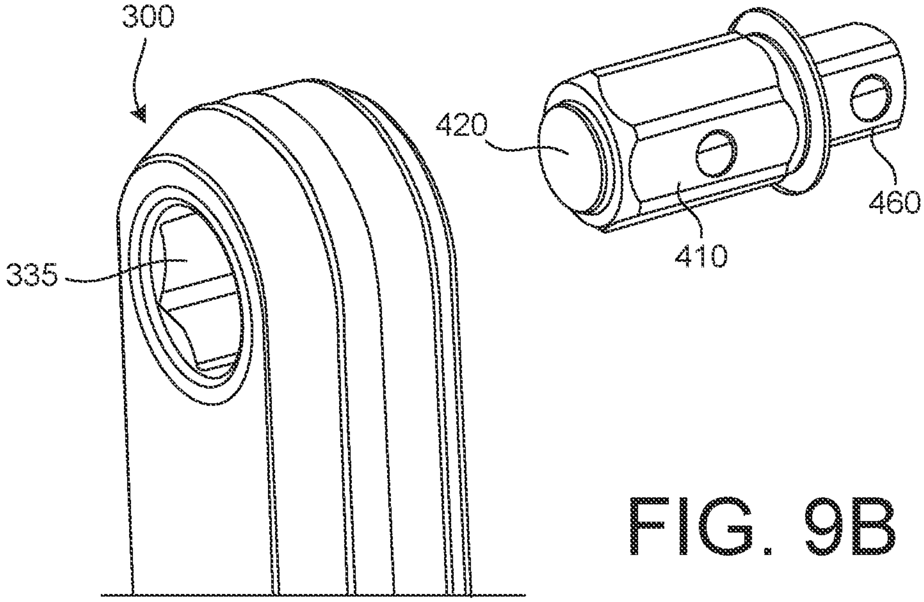
Figure 10:
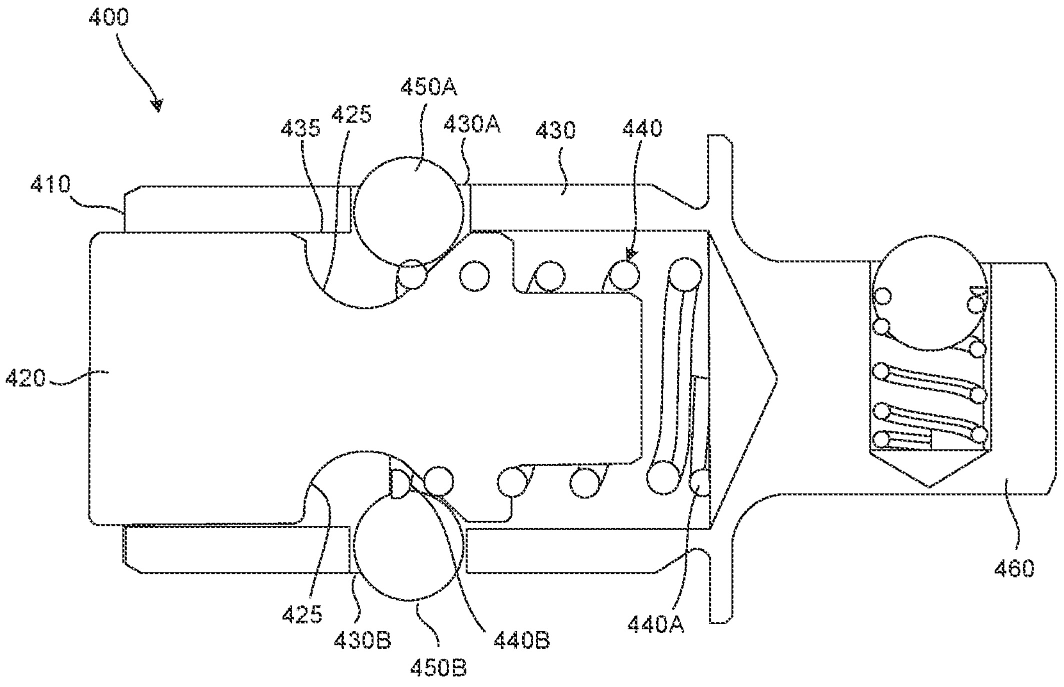
FIG. 10 is a cross-sectional view of the exemplary square drive assembly shown in FIGS. 8, 9A and 9B.
Figure 11A:
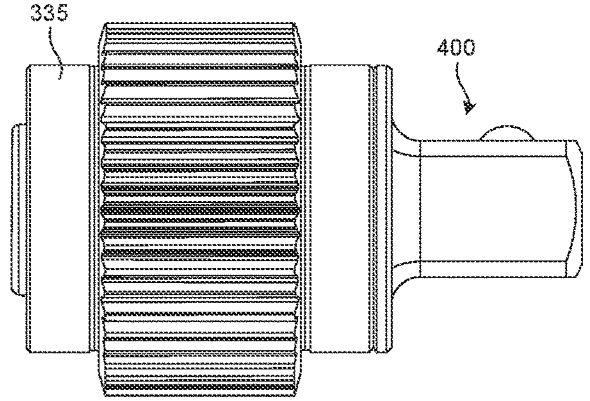
FIG. 11A is a side view of the exemplary square drive assembly.
Figure 11B:
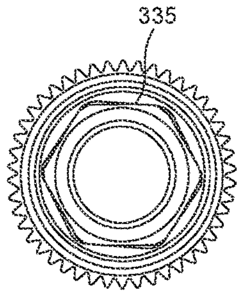
FIG. 11B is a front view of an exemplary output spindle of a ratcheting tool.
Figure 11C:
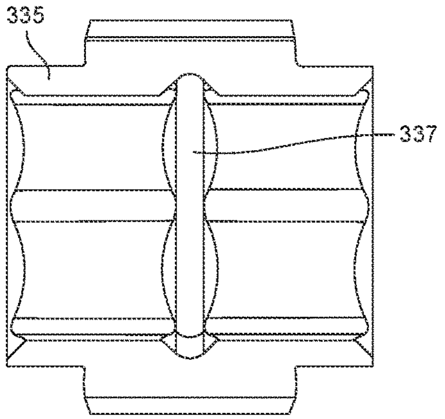
FIG. 11C is a partial view of an inner peripheral portion of the exemplary output spindle, in accordance with implementations described herein.

A removable square drive assembly, in accordance with implementations described herein, may be used with a power driven ratcheting tool such as the power driven ratcheting tool 200 described above, which is operable in both a power driven mode and a manual mode, or with a fully manually operated ratcheting tool. A ratcheting tool 300 including a removable square drive assembly 400, in accordance with implementations described herein, is shown in FIGS. 8, 9A and 9B. FIG. 10 is a cross-sectional view of the exemplary square drive assembly 400 shown in FIGS. 8-9B. FIG. 11A is a side view of the square drive assembly 400 installed in an output spindle 335 of the exemplary ratcheting tool 300, with a housing portion thereof removed. FIG. 11B is a front view of the exemplary output spindle 335, and FIG. 11C is a partial view of an inner peripheral portion of the exemplary output spindle 335.

In some implementations, the square drive assembly 400 may include a retention portion 410, or coupling portion 410, and a working portion 460, or tool interface portion 460. The coupling portion 410 may be removably coupled in an output spindle 335 of the ratcheting tool 300. A release mechanism, in the form of a button 420 in this example implementation, may be movably received in a recess 435 defined in a portion of a housing 430 of the square drive assembly 400 corresponding to the coupling portion 410. A ramped pocket 425 may be defined in the button 420, for example, in an outer circumferential portion of the button 420. A button spring 440 may have a first end 440A positioned at a first end of the recess 435, and a second end 440B fixed to the button 420. A pair of balls 450 (450A, 450B) may be positioned at corresponding openings 430A, 430B in the housing 430. As the coupling portion 410 of the square drive assembly 400 is inserted into the output spindle 335 of the tool 300, the button spring 440 may exert a force on the button 420. The surface of the ramped pocket 425 of the button 420 may transfer the force exerted by the button spring 440 radially, to the pair of balls 450A, 450B. This force transferred to the pair of balls 450A, 450B urge the balls 450A, 450B outward through the openings 430A, 430B, so that the balls 450A, 450B may engage with, or lock into, a groove 337 defined in the output spindle 335, thus locking the square drive assembly 400 in the output spindle 335 of the tool 300. The square drive assembly 400 may be released from the output spindle 335 by depressing the button 420 while pushing or pulling the square drive assembly 400 from the tool 300. Depression of the button 420 compresses the button spring 440, allowing the balls 450A, 450B to disengage the groove 337 in the output spindle 335 and drop into the button ramp pocket 425.

A removable square drive assembly, in accordance with implementations described herein, may allow a user to select a square drive tool that matches a desired interface such as, for example, a socket and the like, without the user of an adapter, thus enhancing utility and functionality to the user. A removable square drive assembly, in accordance with implementations described herein, may allow for easy replacement of a damaged square drive tool, which may be designed to preferentially fail under high loading before other, more expensive and difficult to replace internal parts of the tool, allowing for faster and less costly servicing of the tool. A removable square drive assembly, in accordance with implementations described herein, may be coupled to the ratcheting tool at approximately 180 degrees with respect to a triggering/operation mechanism of the tool, allowing for use of the tool in a relatively small, confined space having limited access, further enhancing utility and functionality.

Figure 12A:
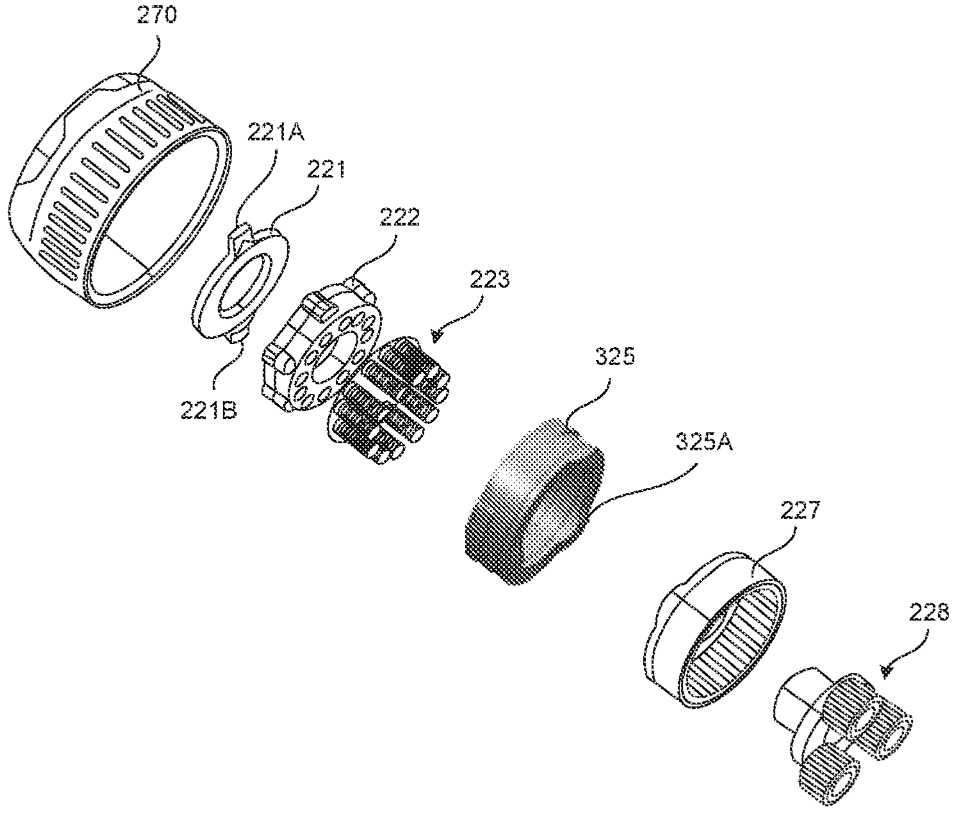
FIGS. 12A, 12B, and 12C are partial, exploded perspective views of the ratchet head portion of the exemplary ratcheting tool shown in FIG. 3A, in accordance with alternate implementations described herein.
Figure 12B:
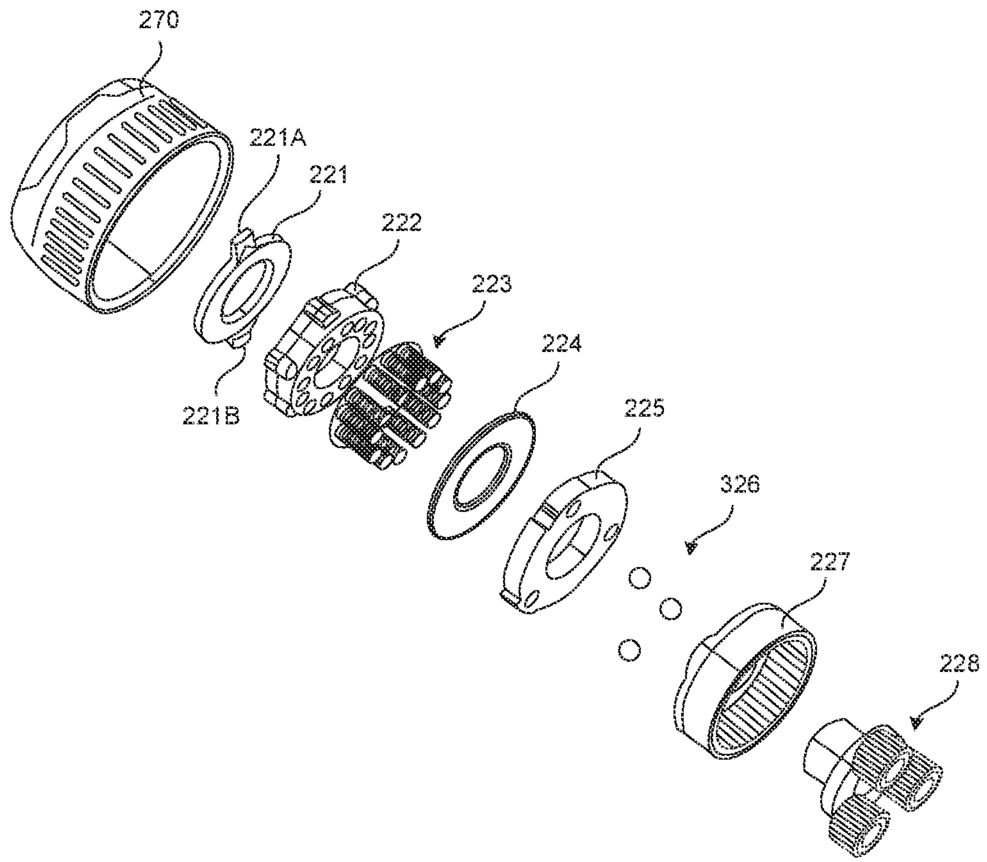
Figure 12C:
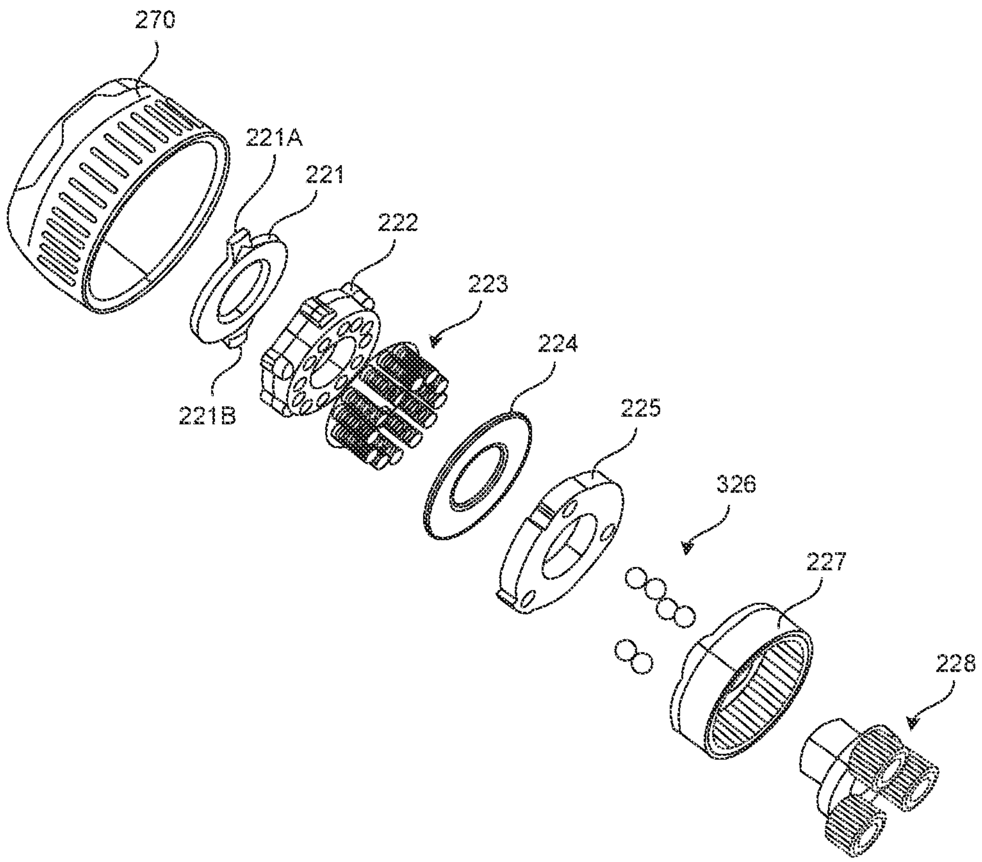

FIGS. 12A, 12B and 12C illustrate alternate implementations of the pin cage 225 and a ring gear engagement element, such as the plurality of clutch pins 226, interacting with the ring gear 227. FIG. 12A illustrates a clutch ramp profile or interface 325 including a ramped surface 325A located on an axial end of clutch ramp profile 325 that operates in sliding contact with the ring gear 227. The opposite axial end of clutch ramp profile 325 interfaces with a plurality of clutch springs 223 that press the clutch ramp profile 325 against the ramped surface 229 of the ring gear 227. A plurality of tabs or slots located radially on the body of the clutch ramp profile 325 interface with ratchet head housing 294, allowing axial movement of clutch ramp profile or interface 325, but prohibiting rotation along any of its axes. In this implementation, the second end portions of the clutch ramp profile 325-2 may engage, or contact, the axial end portion of the ring gear 227, moving, or sliding along the ramp surface 229 of the ring gear 227. The clutch ramp profile or interface 325 and the ramped surface 229 are pressed against each other by a force applied by the clutch springs 223. The magnitude of the force applied by the clutch springs 223, pressing the clutch ramp profile 325 axially against the ramped surface 229, may vary based on an amount of compression of the clutch springs 223. As the output torque level increases, an output torque level exceeding the set maximum output torque level will cause the springs to compress, and cause the clutch ramp profile 325 riding in the ramped surface 229 to jump, or ride over, the ramps 229A, 229B, 229C, allowing the ring gear 227, and the clutch assembly 220, to slip. That is, as a detected amount of output torque, and in particular, detected resistance torque, increases, the ramped surface 225A of clutch ramp profile 325 move along the ramped surface 229, and up the ramps 229A, 229B, 229C. Due to the geometry of the ramps 229A, 229B, 229C, movement of the clutch ramped surface 325-2A up the ramps in this manner causes the clutch ramped profile to move axially, toward the spring cage 222, thus compressing the clutch springs 223. In response to detection of an output torque level that exceeds the set maximum output torque level, the clutch ramped surface 225-2A will move, or travel, or jump over the ramps, disengaging the ring gear 227 and allowing the ring gear 227, and the clutch assembly 220, to slip. In this slipped condition, the ring gear 227 will continue to rotate, or slip, while the trigger 296 is depressed and the motor 210 is generating power, but torque will not be transmitted to the output shaft.

FIGS. 12B and 12C illustrate a clutch assembly with a plurality clutch balls 326. FIGS. 12B and 12C illustrate a pin cage 225 with a plurality clutch balls 326. A functional clutch system can be achieved with a plurality of clutch balls in different formations, (e.g. double stack formation of FIG. 12C or single stack formation of FIG. 12B). The plurality of clutch balls 326 may engage, or contact, the axial end portion of the ring gear 227, moving, rolling, or sliding along the ramp surface 229 of the ring gear 227. The clutch balls 326 and the ramped surface 229 are pressed against each other by a force applied by the clutch springs 223. The magnitude of the force applied by the clutch springs 223, pressing the clutch balls 326 axially against the ramped surface 229, may vary based on an amount of compression of the clutch springs 223. An output torque level exceeding the set maximum output torque level will cause the springs to compress, and cause the clutch balls 326 riding in the ramped surface 229 to jump, or ride over, the ramps 229A, 229B, 229C, allowing the ring gear 227, and the clutch assembly 220, to slip. That is, as an amount of detected output torque, and in particular, detected resistance torque, increases, the clutch balls 326 move along the ramped surface 229, and up the ramps 229A, 229B, 229C. Due to the geometry of the ramps 229A, 229B, 229C, movement of the clutch balls 326 up the ramps in this manner causes the clutch balls 326 to move axially, toward the clutch washer 224, thus moving the clutch washer 224 axially and compressing the clutch springs 223. In response to detection of a high enough torque level, the clutch balls 326 will move, or travel, or jump over the ramps, disengaging the ring gear 227 and allowing the ring gear 227, and the clutch assembly 220, to slip. In this slipped condition, the ring gear 227 will continue to rotate, or slip, while the trigger 296 is depressed and the motor 210 is generating power, but torque will not be transmitted to the output shaft.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described can include various combinations and/or sub-combinations of the functions, components and/or features of the different implementations described.

What is claimed is:

1. A ratchet, comprising:

a housing;

a motor in the housing;

an output drive mechanism coupled to the housing;

a torque selector coupled to the housing, the torque selector being rotatably coupled to the housing, wherein the torque selector is rotatable to a plurality of positions corresponding to a plurality of torque settings, so as to provide for selection of a maximum output torque of the ratchet; and a clutch assembly, wherein the clutch assembly comprises:

a planetary gear set coupled to an output shaft of the motor;

a ring gear having a ramped surface on an axial end portion thereof, a plurality of ramps defined along the ramped surface, and an inner circumferential surface configured to selectively engage the planetary gear set;

a pin cage having a plurality of openings formed therein;

a clutch washer;

a plurality of clutch pins respectively received in the plurality of openings in the pin cage for contact with the plurality of ramps, each of the plurality of clutch pins having a first end thereof in contact with a first side of the clutch washer, and a second end thereof in contact with the axial end portion of the ring gear for movement guided by the ramped surface;

a spring cage having a plurality of recesses formed in a first side thereof;

a plurality of springs each having a first end thereof received in a respective recess of the plurality of recesses in the spring cage, and a second end thereof in contact with a second side of the clutch washer in a manner that positions the clutch washer between the plurality of springs and the plurality of clutch pins; and a pressing plate positioned proximate a second side of the spring cage, and is selectively coupled to the motor and the output drive mechanism.

2. The ratchet of claim 1, wherein the torque selector includes:

a stepped portion extending circumferentially along an inner circumferential surface of the torque selector; and a ramped surface arranged along the stepped portion, a contour of the ramped surface of the torque selector including a plurality of ramps respectively corresponding to the plurality of torque settings.

3. The ratchet of claim 2, wherein the pressing plate includes at least one arm extending radially outward from a peripheral portion of the pressing plate, wherein the at least one arm is configured to engage the ramped surface of the torque selector, and wherein an axial position of the pressing plate is based on the contour of the ramped surface of the torque selector at a rotational position of the torque selector relative to the housing.

4. The ratchet of claim 1, wherein the plurality of clutch springs exert an axial force on the clutch washer that presses the plurality of clutch pins into engagement with the ramped surface on the axial end portion of the ring gear which permits the transmission of the power of the motor to the output drive mechanism.

5. The ratchet of claim 4, wherein a magnitude of the force exerted by the plurality of clutch springs on the clutch washer, and on the plurality of clutch pins on the ramped surface of the ring gear, is based on an axial position of the pressing plate.

6. The ratchet of claim 4, wherein an axial position of the pressing plate is based on engagement of at least one radial arm of the pressing plate with a ramped surface of an inner circumferential portion of the torque selector, and wherein an axial force exerted by the plurality of clutch springs on the plurality of pins and engagement of the pins with the ramped surface on the axial end portion of the ring gear is based on the axial position of the pressing plate.

7. The ratchet of claim 6, wherein:

in response to detection of an output torque that is less than or equal to the selected maximum output torque, a magnitude of the axial force exerted by the plurality of clutch springs on the plurality of clutch pins maintains the engagement of the plurality of pins in the ramped surface on the axial end portion of the ring gear so as to maintain engagement of the motor and the output drive mechanism, and in response to detection of an output torque that is greater than the selected maximum output torque, a magnitude of the axial force exerted by the plurality of clutch springs on the plurality of clutch pins releases allows the plurality of pins to move over the plurality of ramps arranged along the ramped surface on the axial end portion of the ring gear, and releases engagement of the motor and the output drive mechanism.

8. The ratchet of claim 7, wherein:

in response to the detection of the output torque that is less than or equal to the selected maximum output torque, the ring gear remains fixed and in an engaged state with the planetary gear set, and in response to the detection of the output torque that is greater than the selected maximum output torque, the ring gear is rotatable.

9. The ratchet of claim 1, wherein:

the plurality of clutch pins are arranged circumferentially with respect to the pin cage and the ring gear, and are oriented in parallel to each other, and the plurality of clutch pins are movably received in the plurality of openings in the pin cage, and the plurality of springs are arranged circumferentially with respect to the spring cage and oriented in parallel to each other.

10. The ratchet of claim 9, wherein the ring gear, the pin cage, the spring cage and the pressing plate are each arranged along a longitudinal axis defined by the output shaft of the motor and an input shaft of the output drive mechanism.

11. The ratchet of claim 1, wherein:

each of the plurality of torque settings corresponds to a respective maximum output torque level of the output drive mechanism, and wherein the clutch is configured to disengage the coupling of the motor and the output drive mechanism in response to detection of an output torque level that is greater than or equal to the maximum output torque level corresponding to the selected torque setting.

12. The ratchet of claim 1, wherein the ratchet is operable in in a power driven mode in which power is selectively transmitted from the motor to the output drive mechanism via the clutch assembly, and in a manual mode in which the motor and the output drive mechanism are disengaged.

13. The ratchet of claim 1, wherein the motor is at least one of an electric motor or a motor that is air driven.

14. The ratchet of claim 1, further comprising a square drive assembly removably coupled to the output drive mechanism, the square drive assembly including:

a coupling portion configured to be removably coupled in an output spindle of a ratchet head portion of the ratchet;

a tool interface portion coupled to the coupling portion;

a recess defined in an end portion of a housing of the coupling portion;

a button movably installed in the recess;

a spring coupled to the button;

a pocket defined in an outer surface of the button;

at least one ball movably received in the pocket; and at least one opening formed in the housing, at a position corresponding to the at least one ball.

15. The ratchet of claim 14, wherein:

a first end of the spring is coupled to a distal end of the recess, and a second end of the spring is coupled to the button, and the pocket extends circumferentially along an outer peripheral surface of the button.

16. The ratchet of claim 15, wherein, in a released state of the button, a force exerted by the spring on the button urges the at least one ball into the at least one opening.

17. The ratchet of claim 16, wherein, with the button in the released state and the coupling portion of the square drive assembly inserted in the output spindle of the ratchet, the at least one ball is configured to engage a recess formed in the output spindle so as to lock the square drive assembly into the output spindle of the ratchet.

18. The ratchet of claim 17, wherein, in a depressed state of the button, the at least one ball is released into the pocket and is disengaged from the recess formed in the output spindle, so as to release the square drive assembly from the output spindle of the ratchet.

19. A ratchet tool, comprising:

a housing;

a motor in the housing;

an output drive mechanism coupled to the housing;

a torque selector coupled to the housing, the torque selector being operatively coupled to the housing, wherein the torque selector is actuated to a plurality of positions corresponding to a plurality of torque settings, so as to provide for selection of a maximum output torque of the ratchet tool; and a clutch assembly selectively coupling the motor and the output drive mechanism, wherein the clutch assembly comprises:

a planetary gear set coupled to an output shaft of the motor;

a ring gear having a ramped surface on an axial end portion thereof, a plurality of ramps defined along the ramped surface, and an inner circumferential surface configured to selectively engage the planetary gear set;

a pin cage having a plurality of openings formed therein;

a clutch washer;

a plurality of clutch pins respectively received in the plurality of openings in the pin cage for contact with the plurality of ramps, each of the plurality of clutch pins having a first end thereof in contact with a first side of the clutch washer, and a second end thereof in contact with the axial end portion of the ring gear for movement guided by the ramped surface;

a spring cage having a plurality of recesses formed in a first side thereof;

a plurality of springs each having a first end thereof received in a respective recess of the plurality of recesses in the spring cage, and a second end thereof in contact with a second side of the clutch washer in a manner that positions the clutch washer between the plurality of springs and the plurality of clutch pins; and a pressing plate positioned proximate a second side of the spring cage.

20. The ratchet tool of claim 19, wherein the pressing plate includes at least one arm extending radially outward from a peripheral portion of the pressing plate, wherein the at least one arm is configured to engage the ramped surface of the torque selector, and wherein an axial position of the pressing plate is based on the contour of the ramped surface of the torque selector at a rotational position of the torque selector relative to the housing.

21. The ratchet tool of claim 19, wherein the plurality of clutch springs exert an axial force on the clutch washer that presses the plurality of clutch pins into engagement with the ramped surface on the axial end portion of the ring gear which permits the transmission of the power of the motor to the output drive mechanism.

22. The ratchet tool of claim 21, wherein a magnitude of the force exerted by the plurality of clutch springs on the clutch washer, and on the plurality of clutch pins on the ramped surface of the ring gear, is based on an axial position of the pressing plate.

23. The ratchet tool of claim 22, wherein an axial position of the pressing plate is based on engagement of at least one radial arm of the pressing plate with a ramped surface of an inner circumferential portion of the torque selector, and wherein an axial force exerted by the plurality of clutch springs on the plurality of pins and engagement of the pins with the ramped surface on the axial end portion of the ring gear is based on the axial position of the pressing plate.

24. The ratchet tool of claim 19, wherein the ratchet is operable in in a power driven mode in which power is selectively transmitted from the motor to the output drive mechanism via the clutch assembly, and in a manual mode in which the motor and the output drive mechanism are disengaged.

25. The ratchet of claim 19, further comprising a square drive assembly removably coupled to the output drive mechanism, the square drive assembly including:

a coupling portion configured to be removably coupled in an output spindle of a ratchet head portion of the ratchet;

a tool interface portion coupled to the coupling portion;

a recess defined in an end portion of a housing of the coupling portion;

a button movably installed in the recess;

a spring coupled to the button;

a pocket defined in an outer surface of the button;

at least one ball movably received in the pocket; and at least one opening formed in the housing, at a position corresponding to the at least one ball.

26. The ratchet tool of claim 25, wherein, exertion of force on the button in a released or depressed state, permits the at least one ball movably installed in the recess, movement alternately in and out of the recess defined in the end portion of a housing of the coupling portion.

27. A ratchet tool with clutch, further comprising:

a housing;

a motor in the housing;

an output drive mechanism coupled to the housing, the output drive mechanism operatively connected to a drive assembly, the drive assembly including a coupling portion and a tool interface portion wherein the drive assembly is removably coupled in the output drive mechanism that is coupled to the housing;

a torque selector coupled to the housing, the torque selector being rotatably coupled to the housing, wherein the torque selector is rotatable to a plurality of positions corresponding to a plurality of torque settings, so as to provide for selection of a maximum output torque of the ratchet tool; and a clutch assembly selectively coupling the motor and the output drive mechanism, wherein the clutch assembly comprises:

a planetary gear set coupled to an output shaft of the motor;

a ring gear having a ramped surface on an axial end portion thereof, a plurality of ramps defined along the ramped surface, and an inner circumferential surface configured to selectively engage the planetary gear set;

a pin cage having a plurality of openings formed therein;

a clutch washer;

a plurality of clutch pins respectively received in the plurality of openings in the pin cage for contact with the plurality of ramps, each of the plurality of clutch pins having a first end thereof in contact with a first side of the clutch washer, and a second end thereof in contact with the axial end portion of the ring gear for movement guided by the ramped surface;

a spring cage having a plurality of recesses formed in a first side thereof;

a plurality of springs each having a first end thereof received in a respective recess of the plurality of recesses in the spring cage, and a second end thereof in contact with a second side of the clutch washer in a manner that positions the clutch washer between the plurality of springs and the plurality of clutch pins; and a pressing plate positioned proximate a second side of the spring cage.

28. The ratchet tool with clutch of claim 27, wherein the torque selector includes:

a stepped portion extending circumferentially along an inner circumferential surface of the torque selector; and a ramped surface arranged along the stepped portion, a contour of the ramped surface of the torque selector including a plurality of ramps respectively corresponding to the plurality of torque settings.

29. The ratchet tool with clutch of claim 28, wherein the plurality of clutch springs exert an axial force on the clutch washer that presses the plurality of clutch pins into engagement with the ramped surface on the axial end portion of the ring gear which permits the transmission of the power of the motor to the output drive mechanism.

30. The ratchet tool with clutch of claim 28, wherein an axial position of the pressing plate is based on engagement of at least one radial arm of the pressing plate with a ramped surface of an inner circumferential portion of the torque selector, and wherein an axial force exerted by the plurality of clutch springs on the plurality of pins and engagement of the pins with the ramped surface on the axial end portion of the ring gear is based on the axial position of the pressing plate.

31. The ratchet tool with clutch of claim 30, wherein:

in response to detection of an output torque that is less than or equal to the selected maximum output torque, a magnitude of the axial force exerted by the plurality of clutch springs on the plurality of clutch pins maintains the engagement of the plurality of pins in the ramped surface on the axial end portion of the ring gear so as to maintain engagement of the motor and the output drive mechanism, and in response to detection of an output torque that is greater than the selected maximum output torque, a magnitude of the axial force exerted by the plurality of clutch springs on the plurality of clutch pins releases allows the plurality of pins to move over the plurality of ramps arranged along the ramped surface on the axial end portion of the ring gear, and releases engagement of the motor and the output drive mechanism.

32. The ratchet tool with clutch of claim 31, wherein:

in response to the detection of the output torque that is less than or equal to the selected maximum output torque, the ring gear remains fixed and in an engaged state with the planetary gear set, and in response to the detection of the output torque that is greater than the selected maximum output torque, the ring gear is rotatable.

33. The ratchet tool with clutch of claim 27, wherein:

each of the plurality of torque settings corresponds to a respective maximum output torque level of the output drive mechanism, and wherein the clutch is configured to disengage the coupling of the motor and the output drive mechanism in response to detection of an output torque level that is greater than or equal to the maximum output torque level corresponding to the selected torque setting.

34. A ratchet tool with limiting clutch, comprising:

a housing;

a motor in the housing;

an output drive mechanism coupled to the housing, the output drive mechanism operatively connected to a drive assembly, the drive assembly including a coupling portion and a tool interface portion wherein the drive assembly is removably coupled in the output drive mechanism that is coupled to the housing; and a clutch assembly selectively coupling the motor and the output drive mechanism, wherein the clutch assembly comprises:

a planetary gear set coupled to an output shaft of the motor;

a ring gear having a ramped surface on an axial end portion thereof, a plurality of ramps defined along the ramped surface, and an inner circumferential surface configured to selectively engage the planetary gear set;

a pin cage having a plurality of openings formed therein;

a clutch washer;

a plurality of clutch pins respectively received in the plurality of openings in the pin cage for contact with the plurality of ramps, each of the plurality of clutch pins having a first end thereof in contact with a first side of the clutch washer, and a second end thereof in contact with the axial end portion of the ring gear for movement guided by the ramped surface;

a spring cage having a plurality of recesses formed in a first side thereof;

a plurality of springs each having a first end thereof received in a respective recess of the plurality of recesses in the spring cage, and a second end thereof in contact with a second side of the clutch washer in a manner that positions the clutch washer between the plurality of springs and the plurality of clutch pins; and a pressing plate positioned proximate a second side of the spring cage.

* * * * *